INVENTORS
Peter V. Elyosius
Jerome W. Pikos

ATTORNEYS

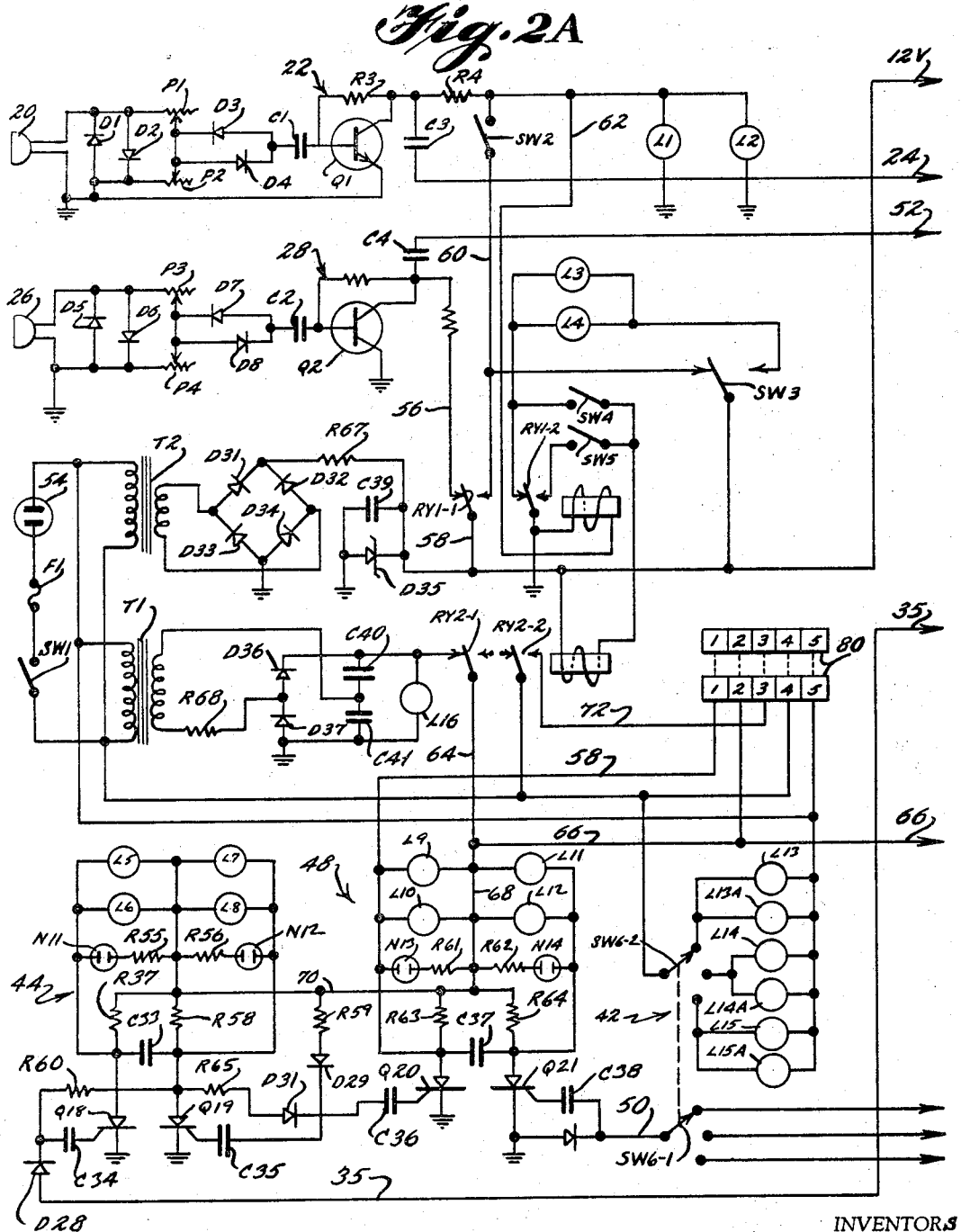

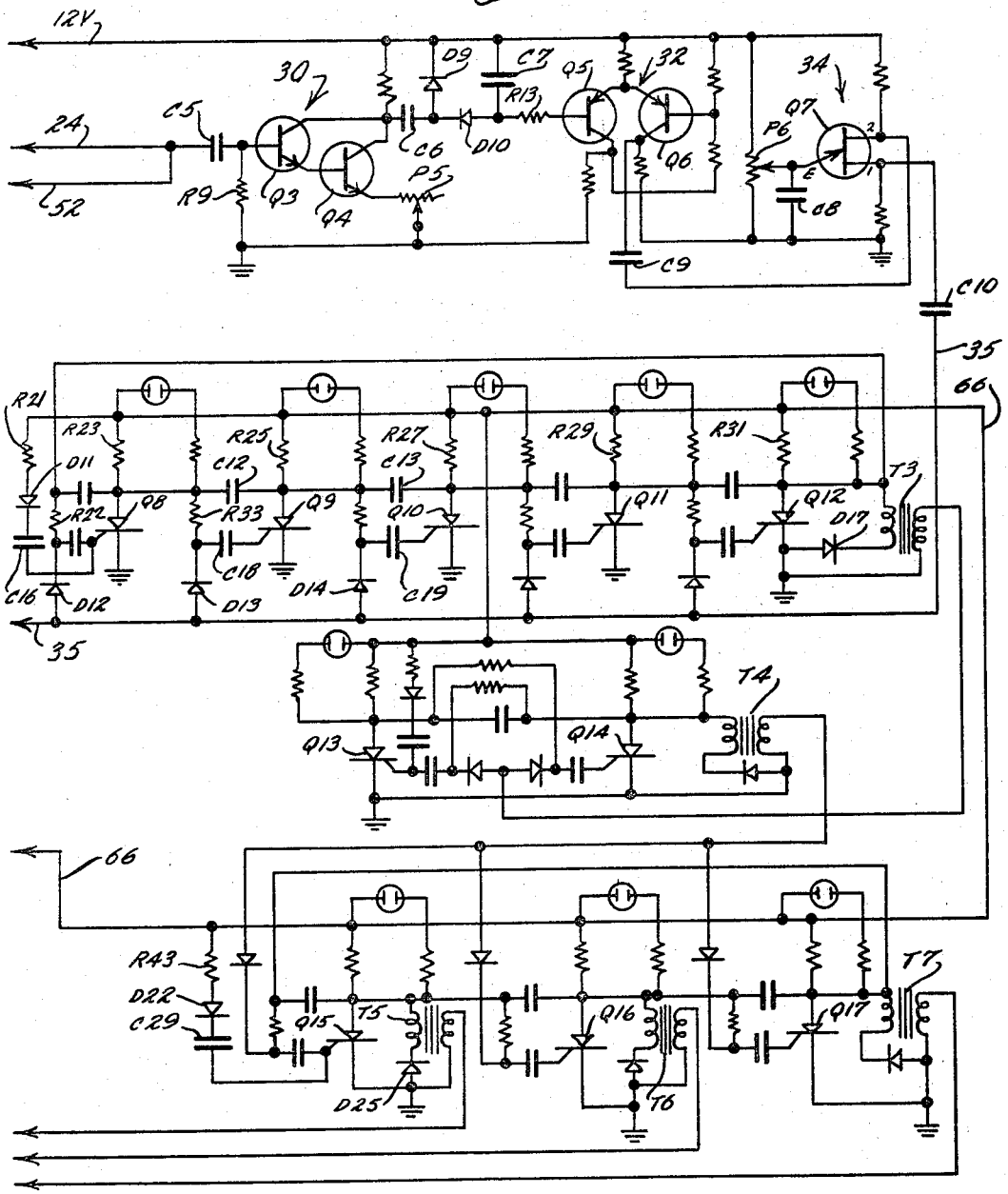

United States Patent Office 3,422,256
Patented Jan. 14, 1969

3,422,256
RATE OF FIRE COMPUTER
Peter V. Elyosius, Hartford, and Jerome W. Pikor, West Hartford, Conn., assignors to B & S Tool Company, Inc., Berlin, Conn.
Filed Oct. 24, 1965, Ser. No. 504,403
U.S. Cl. 235—92        14 Claims
Int. Cl. G06f 7/38; G06g 7/00

This invention relates specifically to a computer for indicating the rate of firing of shots from a gun although it may be used to indicate the rate of occurrence of any repetitive sounds.

One way in which rate of shot firing can be measured is to fire a burst of shots consisting of a predetermined number of shots and measure the time period for the burst. A meter having a clock-driven pointer movable over a dial calibrated in shots per minute and movable only for a given number of shots can be used to indicate the rate of firing. A practical method involves the use of a predetermined variable number of shots for the burst, since for very rapid rate of fire a larger number of shots should be fired than for a slow rate of fire, in order that an appreciable time period may elapse and more accurate measurement be taken. Furthermore, a variable number of shots for determining the rate is desirable since the quantities 10, 20 and 30 represent standard automatic weapon clip sizes, i.e., these are the number of shots customarily fired in a single burst.

It is therefore an object of this invention to provide a shot rate computer which shall have the capability of measuring and indicating the rate of firing of shots over a wide range of rate of firing.

It is another object of the invention to provide controls for the computer to initiate operation of the rate pointer or indicator on the first shot being fired and to stop indicator operation upon the last of a predetermined number of shots being fired.

It is still another object of the invention to provide for variation in the number of shots which shall cause cessation of indicator operation.

Yet another object of the invention is to provide a multiple number of rate indicators or clocks so that the rate of short bursts of shots at high rate of repetition may be easily determined on one clock, while longer bursts may be indicated on a companion clock.

Other objects of the invention will become apparent upon consideration of the following specification when read in conjunction with the accompanying drawings in which:

FIGS. 2A and 2B are diagrams of the circuits forming part of the invention;

The computer in general comprises two sound pickups, one adjacent a remote gun being fired and the other at a local station removed from the gun, either one of which pickups, to the exclusion of the other, may be used as determined by switch operation. Either of the pickups could be used for the location of the bursts at the location of the remote gun or at the local station, or the remote pickup may be used exclusively for pickup of the rate of firing of the remote gun, while the local pickup would be used for firing at the local station only. A control switch is utilized to determine the number of shots fired in a burst which is to be treated by the computer, in this specific instance, 10, 20, or 30 shots. The first shot of the burst initiates the operation of a counter and clock-driven indicators and the last predetermined shot of a burst, i.e., the 10th or the 20th or the 30th shot, halts the operation of the counter and the advancement of the indicators. After the indicators have been read, a reset switch resets the computer to original condition, including resetting of the counters and resetting of the indicator pointers. Suitable lights are located at the remote gun location and at the local station to indicate the various states of the computer before, during, and after computer operation.

Figure 1:
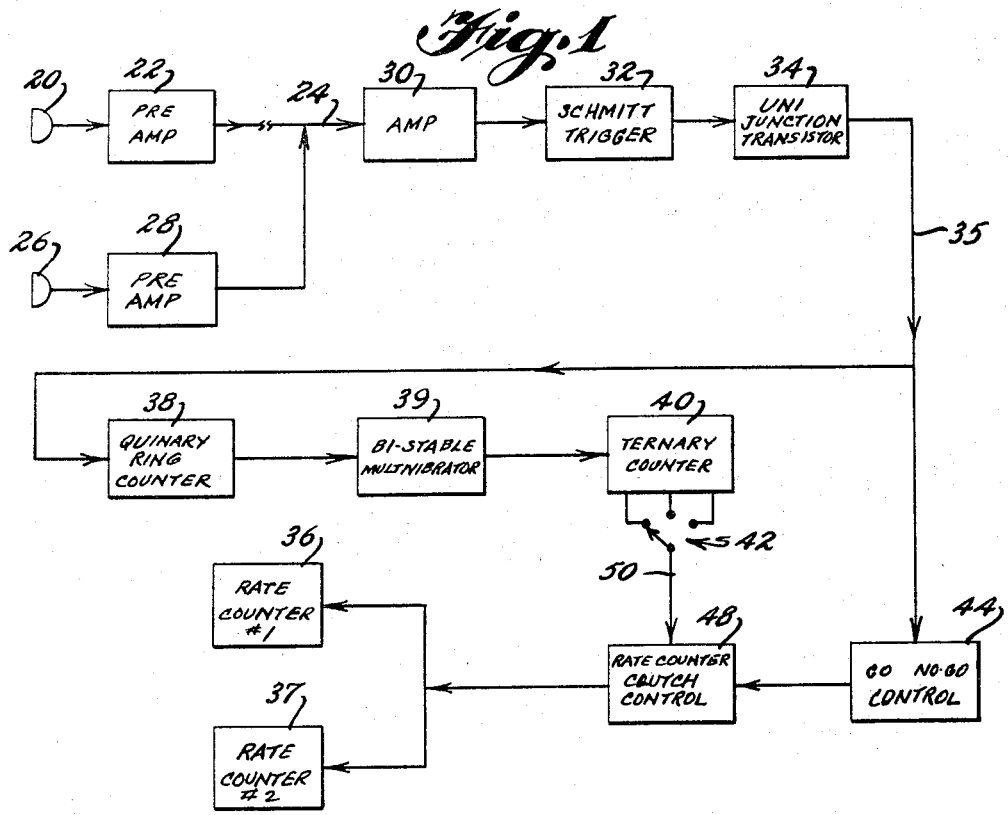
FIG. 1 is a flow diagram of the instrumentalities forming the invention.

Now referring to the drawings and for the present considering the block diagram of FIG. 1, the shot burst input to the computer is a microphone 20 connected to a preamplifier 22 close to the microphone so as to send a signal at fairly high level along a cable 24 to a local computer station, not specifically indicated. At the computer station there is located a second microphone 26 and preamplifier 28 to be used as local equipment for the counter and connected at the local computer station end to the cable 24 from the first preamplifier. Either one of the output signals from the preamplifiers may be used at will to compute the rate of firing of the gun. The signal at the station end of the cable is amplified, as indicated by amplifier 30, fed to a Schmitt trigger 32 and then via a unijunction transistor 34 and trigger line 35 to a counter system involving an electronic counter and meters 36 and 37 having clock-driven pointers. Since the ultimate rate to be shown on the rate counter clocks will be the rate as determined by 10, 20, or 30 shots, selected as optimum numbers of shots, the counter must be able to have outputs of these values. To accomplish this the counter consists of three cascaded subcounters comprising a quinary ring counter 38, a series connected bistable multivibrator counter 39, and a series connected ternary counter 40. The ternary counter is provided with outputs from each om its stages so that, at will, a count of 10, 20, or 30 may be obtained therefrom as selected by a manually positioned switch 42. The first shot of a burst will be transmitted to a "GO," "NO GO" control 44 via the line 35, which in turn will control a rate counter clutch control 48 to couple the rate indicating hand of each of the pair of rate counters 36, 37 to a synchronous motor therein. While the line 35 is connected between the output of the unijunction transistor 34 and the "GO," "NO GO" control 44 to effect clutching of the indicating hands of the the rate counters 36 and 37 to the clock mechanism at the first shot, there is a second line 50 connected between the switch arm of switch 42 and the rate counter clutch control 48 to declutch the hands of the rate counters from their clock motor drives upon a pulse appearing in the line 50.

Before considering the circuit in greater detail, consideration should first be given to the particular problems involved in picking up signals from gun shots. While conventional crystal microphones are employed to pick up the sounds of the shots, it has been found that connecting a crystal microphone, as microphone 20, and which serves as transducer in the pickup, directly to the input of the preamplifier 22, does not provide adequate signal-handling capability. Primarily this is due to the nature of the input. Normally the input signal to the pickup unit is the sound of automatic weapon firing. This sound must provide both counting and timing signals. The ideal output from the pickup would be a perfect, rectangular, narrow pulse for each shot. Practically, this is impossible. The sound of the shot begins with a shock wave of indeterminate frequency. This originates at the site of the explosion, travels down the barrel and expands from the muzzle. Some part of it is transmitted directly through the metal of the firing chamber to the outside. At the time of the explosion all resonant structures and cavities associated with the gun are excited into vibration. As the shock wave travels outward, it also excites into vibration everything it strikes, causing new sound sources to be created. All of these sounds arrive at the microphone as a complex wave package. Shortly after this first package is delivered, others arrive in the form of echoes. Some of these are from surfaces in close proximity to the gun or the pickup. Both of these will experience only slight delays. Reflections from floor, ceiling and walls will be delayed by greater amounts. Echoes from walls 25 feet away will take about 28 milliseconds to reach the pickup. Some of the sounds will re-echo. Total reverberation time may exceed one second.

Specifications usually require counting ability from 200 or less up to 2,000 shots per minute. At this rate the interval between shots is only 30 milliseconds, so the reverberation trains are sure to overlap. Consequently the electronic triggering for the computer cannot depend on a "presence or absence" type of input signal, because there would never be a time of absence. A silhouette of the oscillographic representation of the input signal would show a series of jagged sawteeth interspersed with damped trains of sharp spikes. Taking a one-shot period, it begins with a very high intensity spike followed by lesser ones mixed with a jumble of complex wave peaks. Decay of the train is not a simple decrease in energy level. Instead the level falls and rises repeatedly.

A trigger circuit designed to respond only to increases or only to decreases in energy level would find many of each in a one-shot period. One responding to absolute magnitude would be possible if a transducer of excellent linearity at high energy levels were available. Unfortunately, available transducers saturate on many of the recurrent peaks, so maximum output is produced several times during the period. Nevertheless there is a distinct grouping of energy pulses during each period and a general falling off of levels towards the end of the period. By integrating and storing pulse-energy while allowing it to leak off at a steady rate, it is possible to discriminate between shots.

The discriminatory process begins right at the transducer with acoustic shielding and insulation. Next, special provisions are made to pick out the right peak in the sound of a gun shot. To do so special circuitry is necessary. As shown in detail in FIG. 2A, the output of the transducer is shunted by a pair of silicon diodes D1, D2, oppositely oriented. In a high level energy circuit these diodes would be a short circuit across the line. However, at microphone output levels they form a variable resistance shunt which acts to clip or reduce pulse peaks. The crystal microphone preferably used resists saturation better when working into a low resistance load, so a variable low resistance load P1, P2 is also shunted across the output line. It preferably consists of a 50K-ohm potentiometer in series with a 1K-ohm one, the large one being used for coarse adjustment and the small one for fine adjustment of the output from the microphone. These potentiometers determine the output of the pickup units. The take-off point is between the potentiometers. A second pair of diodes D3, D4 is in series with a coupling capacitor C1 which connects this point with the base of a preamplifier transistor Q1. These diodes D3, D4, present high impedance to low-level signals, thus helping to eliminate the effect of comparatively low-level noises such as long-path echoes, sound of other guns, etc.

Compared with the original sounds, the output is more nearly a grouping of individual spikes with less of the background of reverberent complex waves. When intergrated, as by the system about to be described, such a signal is easier to resolve into periodic groupings.

The second, local crystal microphone 26 is provided with an arrangement of diodes D5, D6, D7, D8, potentiometers P3, P4, and capacitor C2 leading to a transistor Q2 similar to the diodes and associated parts connected with pickup microphone 20.

The power supply to the transistors and other circuit elements will be described later. At present, it is sufficient to state that the output of preamplifier transistor Q1 is fed via a capacitor C3 to the end of the cable 24 adjacent the gun and in like manner the output of preamplifier transistor Q2 is fed via a capacitor C4 via a line 52 to the end of the cable 24 at the local rate counter station, see FIG. 2B. The last end of the cable is connected via a filter arrangement composed of capacitor C5 and resistor R9 to the amplifier 30, preferably a Darlington amplifier, including cascaded transistors Q3, Q4, a potentiometer P5 being provided in the emitter to ground connection of the second transistor Q4 to vary the gain of the amplifier. The output of the Darlington amplifier is fed via a filter and rectifier network composed of capacitor C6, diodes D9, D10 and capacitor C7 and via a resistor R13 to the base of the first one of a pair of transistors Q5, Q6 forming a conventional Schmitt trigger 32, negative going pulses from which are fed via capacitor C9 to base #2 of a unijunction transistor Q7 (box 34 in FIG. 1), base #1 of that transistor supplying the pulses to the counter system via capacitor C10. The emitter of the unijunction transistor is maintained at a critical voltage by placing a charge on capacitor C8 through a potentiometer P6. This critical voltage is a stable fraction of the voltage between bases #1 and #2 of the unijunction transistor.

The pair of diodes D9, D10 and the capacitor C7 in the output circuit of the Darlington amplifier, together with the input resistance R13 to the Schmitt trigger, perform the integrating function above referred to. The signal, after integration, is in the form of a damped sawtooth wave train, rising abruptly to maximum at the first shockwave, declining slowly, rising to peak value again before dropping far, falling slowly again, etc. Each valley falls a little deeper. hTe peaks in the later stages fail to reach maximum. The trend is definitely downward.

The first peak actuates the Schmitt trigger into its "ON" state, the actual trigger point being somewhere near maximum, at a level higher than the peaks of the later spikes. The dropout level of the Schmitt trigger, the level at which it turns off, is lower than the bottoms of the first valleys. These valley-bottoms do not fall to turn-off level until the peaks have subsided enough to prevent retriggering. The gain control P5 on the Darlington amplifier sets the amplitude range to fulfill this requirement. When all controls are properly set, the Schmitt trigger turns on within microseconds of the first shock wave, simultaneously firing the unijunction transistor Q7 and so producing a signal via capacitor C10 on the trigger line 35 to the counter and to other portions of the system. The unijunction transistor fires only on the Schmitt trigger turn-on action, so it produces one pulse for each shot.

Thus the Schmitt trigger establishes a dividing line in the computer circuitry. Everything following it is independent of the input signal; everything before it is involved in handling and transforming the input signal itself. The pickup units or microphones are first in line. Only one of these is used at a time. A relay arrangement Ry1, FIG. 2A, as will be disclosed, permits selection of either one by removing power from the undesired one.

Power for the entire computer is taken from a 115 VAC line and is under control of a switch Sw1 in a line having a fuse F1 and a plug 54. Indicator hand driving motors in the clocks and indicator hand reset circuits operate directly from the line, as will be described. There are a number of silicon controlled rectifiers in the system. These and the rate counter clutches operate from a nominal 100 D.C. supply. This is obtained from a conventional voltage double system involving a transformer T1 under control of the switch Sw1, a resistance R68, rectifiers D36, D37 and capacitors C40, C41. Since isolation of the equipment from the 115 volt line was found to be desirable to avoid spurious pulses, a transformer is used and advantage is thereupon taken to utilize a simple full wave rectifier in the form disclosed and a voltage doubler to obtain the desired 100 volts. A lamp L16 indicates the "ON" condition of the power supply, as well as supplying a desirable load for the rectifier when otherwise unloaded. The rest of the circuits operate from 12 volts, direct current, obtained from a separate conventional power supply also under control of switch Sw1 and the fuse and involving transformer T2, full wave rectifier diodes D31, D32, D33 and D34 and a filter utilizing a resistor R67 and capacitor C39. A voltage regulating Zener diode D35 is also employed at the output of the low voltage supply.

How the voltages are applied to the selected pickup units and to certain lamp indicators will now be described. At the remote pickup unit, that is, at the gun station, there is located a single-pole single-throw switch Sw2. At the local station there is located a single-pole double-throw switch Sw3, normally at the position shown, and a relay operated pole Ry1–1 is in condition for energizing the local pickup via line 56. If it be desired to disconnect the local pickup and couple in this remote pickup, the switch Sw2 at the remote pickup is closed, a circuit thereby being established as follows: From the positive pole of the 12 volt supply via a line 58 to the pole of switch Sw3, thence via a line 60 leading to switch pole Sw2 (at the gun station) back via a line 62 to the relay coil of relay Ry1, to ground and back to the negative pole of the 12 volt source. The coil when energized attracts the armatures Ry1–1 and Ry1–2, thereby removing 12 volt potential from line 56 leading to the local pickup. Potential is applied to transistor Q1 as well as its biasing resistor R3 of the remote pickup unit and to indicator light L1 at the remote pickup unit as well as indicator lamp L2 at the local station. By reason of shifting of pole Ry1–1; low voltage is supplied to the remote pickup unit regardless of the subsequent position of switch Sw3. Also pole Ry1–2 is removed from being series relation with a local reset switch Sw4 and is placed in series with a pickup unit located reset switch Sw5. Closure of either switch Sw4 or Sw5, dependent on the position of pole Ry1–2, will prime or condition for energization the coil of a relay Ry2 for resetting the computer, as will be described. When switch Sw3 is thrown to the normally "OFF" contact, remote switch Sw2 is rendered ineffective, current in the relay coil Ry1 is cut off and the armature of relay Ry1 return to normal position. Advice of this is given by closure of the circuit to indicator lamp L3 at the remote unit and indicator lamp L4 at the local station.

The low voltage supply also furnishes the energy necessary to energize the transistors in the Darlington amplifier, in the Schmitt trigger, and the unijunction transistor, suitable resistors being utilized in these devices, each of which device by itself, is conventional and therefore need no further description.

As stated hereinabove, the second armature Ry1–2 of relay Ry1 conditions a circuit for the second relay Ry2, this second relay controlling rate counting operations on the rate counter clocks, as will be explained later.

In the unenergized condition of relay Ry2 the nominal 100 volt D.C. supply is connected via an armature Ry 2–1 and line 64, and via line 66 to silicon controlled rectifiers (SCR's) in each of the subcounters. This line also serves to reset the subcounters when the pole Ry 2–1 is opened and reclosed. The line 64, via branch line 68, also feeds the silicon controlled rectifiers Q20 and Q21 in the rate counter clutch control device 48 and via branch lines 68 and 70 SCR's Q18 and Q19 in the "GO," "NO GO" control device 44. When relay Ry2 is energized power is removed from the silicon controlled rectifiers, allowing such of them which had been rendered conductive to become non-conductive. A second relay armature Ry2–2 in its normal position is ineffective. When relay Ry2 is energized by momentary operation of switch Sw4 or Sw5, relay armature Ry2–2 is shifted to apply 115 volt A.C. line potential, via conductor 72, to the clocks to reset them. Upon cessation of energization of relay Ry2 the poles are biased to cause pole Ry2–1 to again establish contact with the 100 volt supply sending an initial pulse to the first of the SCR's in each subcounter and to the "GO" SCRQ19 in the control 44, via resistance R59, diode D29 and capacitor C35.

Now considering the subcounters (see FIG. 2B) more in detail, the shut pulses from the unijunction transistor Q7 (indicated as 34 in FIG. 1) are fed via the capacitor C10 and line 25 to the quinary ring counter. This counter, like the others in the system, employs silicon controlled recifiers as the active elements.

It is basic to all such counter circuits that each element be capable of two states, e.g. conducting the nonconducting or on and off. It is further required that when an external event operates to change the state of one element, the change itself must be capable of producing the opposite type change in another element.

Assume, for example, a chain of SCR's, Q8 to Q12, connected as follows: The cathodes all go to ground or a D.C. minus bus. The anodes all go through individual resistors R23, R25, R27, R29 and R31 to the D.C. plus bus 26. A capacitor, C12 connects the anode of SCRQ9 to the anode of SCRQ8. Another capacitor C13 connects the anode of SCRQ10 to that of SCRQ9, etc. That is, all adjacent SCR's form mutual turn-on/turn-off pairs. The gates of the SCR's go to input capacitors C18, C19, etc., which pass along pulses reaching them from the unijunction transistor and through input diodes as D13, D14. The load resistor as R33 for each diode is returned to the anode of the preceding SCR as SCRQ8.

Since SCR gates require positive pulses for triggering, the input diodes D11, D12, D13, etc. are oriented accordingly. The diode resistors R22, R33, etc. consequently are connected from diode cathode to SCR anode, the diode cathode connected to resistor R22 being connected via feedback line 74 to the anode of SCRQ12. If the SCR anode be at ground level, as it is when the SCR is conducting, the diode return is complete and the diode is capable of passing on relatively small positive pulses applied to its own anode. If the SCR be not conducting, its anode is at plus bus potential, reverse biasing the diode and preventing any feedthrough of pulses applied to the anode of the diode.

In such a circuit, if all the SCR's are in the nonconducting state, all diodes are reverse-biased and all trigger pulses are ineffective. Assume, though, that SCRQ8 had been previously placed in a conducting state by reason of initial closing of the 12 volt line by release of armature or pole Ry2–1, and the sending of a pulse through resistance R21, diode D11 and capacitor C16 to the gate of SCRQ8. A positive pulse applied to the diode D13 of SCRQ9 will then be able via capacitor C18 to turn on SCRQ9 and simultaneously turn off SCRQ8. This turn off is effected by reason of the sudden drop of potential at the anode of the SCRQ9, being transmitted via capacitor C12 to the anode of SCRQ8 momentarily robbing it of positive potential. A pulse at Q10 will then turn Q10 on and Q9 off, etc. Since only the diode following a conducting SCR can accept effective pulses, all diodes are tied to the common trigger input line 35. Successive pulses act to move the conducting state step by step down the chain. The last element in the chain is coupled via a feed-back line 74 to the element Q8, thereby providing a ring counter.

In the computer the first counter section is the five-element ring counter just described. Reset action independently of the feedback line sends a pulse through line 66 which turns on SCRQ8, as already described. All shot impulses appear on the trigger line 35. At shot number 5 the SCRQ8 returned to the conducting state which it left at shot number 1. It leaves that state again a shot number 6, returning at shot number 10. Thus it resumes a conducting state every fifth shot. This return to an "ON" state generates a pulse which operates the subsequent other counting circuits. The first subcounter produces one output pulse for each five input pulses. Its output, transmitted via diode D17 and transformer T3, is the input of a two-element ring subcounter here disclosed as a binary flip-flop employing two SCR's Q13 and Q14 in a conventional binary multivibrator circuit. The flip-flop produces one output pulse for each two input pulses, or one output pulse for each ten shots. Each output pulse is transmitted via output transformer T4 to the third subcounter.

Figure 3:
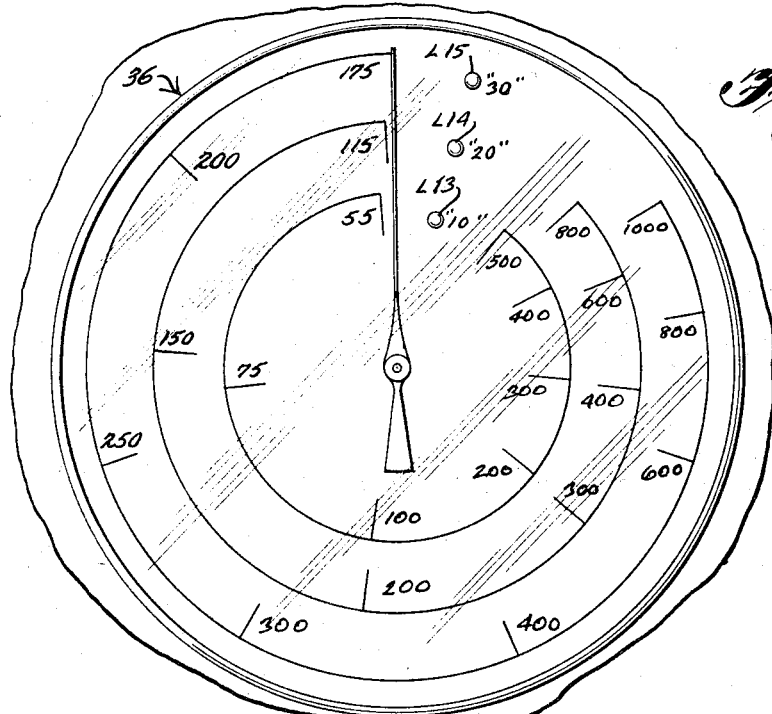
FIG. 3 is a view of the dial face used on one of the clocks used to indicate rate of firing of the shots.
Figure 4:
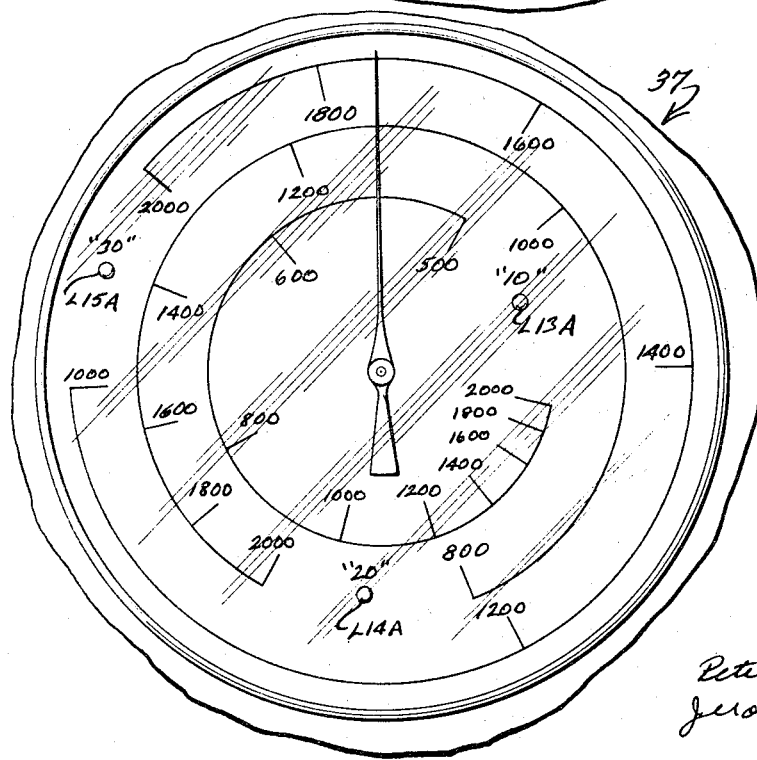
FIG. 4 is a similar view of a second clock used in the computer.

The third subcounter is a chain of three SCR's, Q15, Q16, and Q17. SCRQ15 is turned on by the reset pulse via resistor R43, diode D22 and capacitor C29. Input pulse number 1 (shot number 10) triggers SCRQ16 producing an output pulse from the transformer T5 coupled to the anode of SCRQ15 when that SCR is turned off, the diode D25 determining the selection of the direction of pulse. Input pulse number 2 (shot number 20) triggers SCRQ17; and the transformer T6 on SCRQ16 provides an output pulse. Input pulse number 3 (shot number 30) retriggers SCRQ15; and the transformer T7 on SCRQ17 provides output while SCRQ17 is being turned off. Thus the outputs of these three pulse transformers T5, T6 and T7 indicates counts of 10, 20, and 30 shots. The desired output is selected by the three-position switch 42, previously referred to and indicated in FIG. 2A as Sw6, and fed to the gate of SCRQ21 via the line 50, the SCRQ21 being one of a clock control pair of SCR's, the other of which has been designated as Q20. The position of the switch Sw6 is indicated by the lighting of lamps L13, L14 and L15, these being opposite respective scales on clock 36 (FIG. 3) and lamps L13A, L14A and L15A, these being on companion scales on clock 37 (FIG. 4).

The selection of 10, 20 or 30 shots by switch 42 makes it possible, when working with longer bursts, to determine rate constancy by making several measurements. For example, for 30 shot bursts the following measurements are made:

1st burst—use 10-shot input setting—get first 10 shot rate ignoring the rest.
2nd burst—use 20-shot setting—get 20-shot rate.
3rd burst—use 30-shot setting—get full burst rate.

Compare and calculate variations.

All told the counter uses ten SCR's. It would have been possible to use an all flip-flop binary counter using the same number of active elements, but resetting would have been more complicated. If the flip-flops employed cheaper transistors as the active elements, the output would need amplification in order to trigger the off SCR. By using identical SCR's throughout, all trigger-pulse levels can be equalized for uniform results.

The reset circuit is relatively simple. Pressing the reset switch, Sw4, or Sw5, dependent on the position of pole Ry1-1 of relay Ry1, energizes the relay Ry2 which performs the actual reset functions as previously described. Since the reset relay operates from D.C., it is possible to incorporate elements to delay opening after it is energized. This insures against incomplete reset action when the reset switch is handled carelessly. As stated heretofore, one pole of the relay (armature Ry2-2) closes the 115 volt reset circuit to the clocks. The other, through loss of voltage, opens the 100-volt bus and branches going to the SCR's and clutch circuits deactivating any SCR which may have been on and releasing the clutches in the clocks. When voltage returns a part of the positive-going voltage shift is applied to the reset pulse line. This line resets all the initial SCR's in the counters and the "GO "NO GO" SCRQ19.

When voltage is first applied to the instrument, as by closing switch Sw1, a pulse is transmitted from the 100-volt line and lead 64 and branch lines 68, 70 and via ballast resistor R59 to diode D29 and then via capacitor C35 to the gate of SCRQ19, causing the SCRQ19 to turn on. 100-volt current now flows through the branch line 70, ballast resistor R58 and SCRQ19, creating a potential difference across the resistor, thereby illuminating the bridging paralleled lights L7 and L8 at the gun and at the local station, respectively, to indicate the "NO GO," or ready for but not yet counting, condition of the computer. Also the neon N12 and its ballast resistor R56 on the circuit board are placed across the terminals of resistor R58, this neon assisting in servicing of the instrument. On the first shot being fired a pulse will be transmitted via lead 35, diode D28 and capacitor C34 to the gate of SCRQ18, thereby turning SCRQ18 on. By reason of pulse transmission through capacitor C33, SCRQ19 is turned off and the indicator lights L7 and L8, as well as neon N12, thereby being extinguished. The lights are extinguished because no potential difference appears across the resistor R58. Lights L5 and L6 at the two stations and neon lamp N11 on the circuit board with its ballast resistor R55, across the resistor R57, will now become lit, indicating a "GO" or now counting condition of the instrument. At the same time the initial shot pulse will be further transmitted via resistors R60 and R65, diode D31 and capacitor C36 to the gate of SCRQ20, causing SCRQ20 to become conductive and current to flow through resistor R63. Lights L9, L10 and neon N13 and its ballast resistor R61 at the remote and local stations and on the circuit board respectively, all across the resistor R63 will therefore become energized to indicate that a count had started and further that the meter had not been read. When a count is incomplete (as 29 instead of 30 shots being received) the lights L9, L10 and N13 stay on beyond a normal period, an indication that the clock readings are not to be read. In such a case recount is started by operating the appropriate reset switch Sw4 or Sw5. Therefore the term "MISFIRE" is applied to these indicators.

The switch 42 is indicated on FIG. 2 as being two poles, Sw6–1 and Sw6–2. It is operated to select which of the rates of 10, 20, or 30 shots is to be indicated on the rate meters. Switch pole Sw6–1 connects a selected output from transformers T5, T6 and T7 to the gate of SCRQ21. Switch pole Sw6–2 connects the 115-volt line to a selected one of the lamps L13, L14 and L15 on clock 36 and in like manner to selected lamps L13A, L14A and L15A on clock 37. Each lamp is associated with a scale on a clock to be read, dependent on the count selected. When a pulse, responsive to a completed count of 10, 20 or 30 shots, does traverse switch arm Sw6–1 and via capacitor C38 does reach the gate of SCRQ21, SCRQ21 is turned on, thereby indicating on indicators L11 and L12 across the resistor R64 at the remote and local stations, respectively, and the neon N14 and its ballast resistor R62 on the circuit board that the clock readings should be taken. The pulse rendering SCRQ21 conductive also causes a sudden drop of potential at the junction of resistor R64 and the anode of SCRQ21 thereby transmitting a negative pulse via a capacitor C37 to the anode of SCRQ20, which, after the first shot, had been rendered conductive. The negative pulse or drop in potential interrupts the flow of current through SCRQ20, thereby extinguishing the "MISFIRE" lights. Since SCRQ20 via line 58 is in series with the return line from the clutch coils in the clocks, as will be clear from further perusal of the specification, when current through the SCRQ20 ceases the clutches are released and the clock indicator hands stop moving.

Recapitulating, when the computer is first turned on, and after each reset, both SCR's Q20 and Q21 are non-conducting. The first shot triggers the on SCRQ20, starts the clocks, and lights the "MISFIRE" indicators, L9, L10 and N13. The last shot triggers the off SCRQ21, turns off the on SCRQ20 and its loads, and turns on the READ METER indicators L11, L12 and N14.

Each of the clocks is alike in operative structure except that one drives the pointer ten times as fast as the other. The clocks, however, are equipped with different dials.

Figure 5:
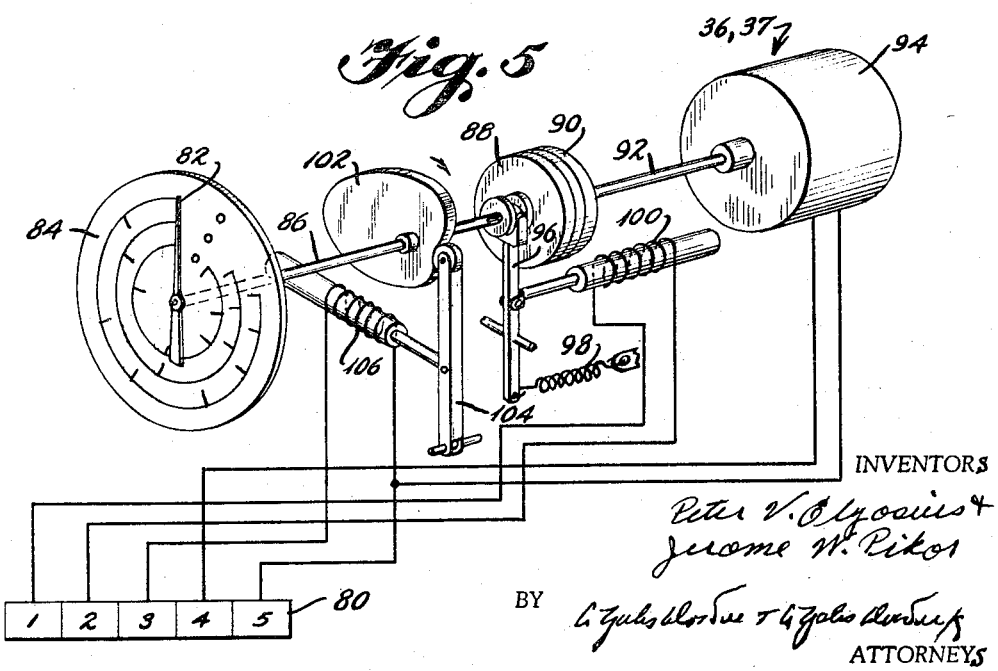
FIG. 5 is a diagrammatic representation of the mechanism in each of the clocks.

Each of the clocks has electrical leads attached to terminal boards 80, FIG. 2A and FIG. 5, these boards being wired in parallel.

The mechanism of each clock may be of various characters. As exemplified diagrammatically in FIG. 5, a pointer 82 movable over a dial 84 is fast with a shaft 86 on which is fixed a clutch disk 88. Cooperating with this disk is a second clutch disk 90 splined on a shaft 92 coaxial with shaft 86, said shaft 92 being driven by a synchronous motor 94 in the 115 volt A.C. line hitherto referred to and of which the cycles are timed by a master clock at the generating station as is common practice. Clutch disk 90 is shifted by a pivoted clutch shifter 96 against the action of spring 98 hooked into the clutch shifter at one end and to a fixed element of the clock at the other end. This clutch shifter is adapted to move the clutch disk to operative position by energization of a coil 100 operative on a magnetic portion pivoted to the clutch shifter, the coil being connected to terminals 1 and 2 of the terminal board, the coil being energized when SCRQ20 is turned on, concurrently with the first shot being fired. When the 10th, 20th or 30th shot is fired, dependent on the position of switch arm Sw6-1, SCRQ20 is turned off as previously described and the coil 100 is deenergized allowing the spring 98 to release the clutch and stopping the pointer movement. After a reading on the dial is obtained, the pointer 82 may be reset to home or zero position. For this purpose the pointer shaft 86 has secured to it a heart-shaped cam 102 against which a lever 104 rests. When a reset coil 106 is energized the lever is forced against the heart-shaped cam returning it to a position where the pointer is at zero. Reset coil is connected to terminals 3 and 5 of the terminal board 80. When reset switch Sw3 or Sw4 is operated, relay Ry2 is energized closing the armature Ry2–2 against a contact of the relay, which contact is connected with terminal 3 on the terminal board. Terminal 5 of the board is connected to the 115-volt line. The motor 94 is connected to terminals 4 and 5 of the terminal board, these terminals being energized from the 115-volt line whenever main switch Sw1 is closed. The only difference between the clocks is that the motor of clock 37 has gearing to drive the pointer 82 at ten times the speed of the pointer on clock 36.

Each of the clocks has dials with three scales thereon, the scale selected being indicated by lighting of the associated lamp and in accordance with which firing burst, 10, 20 or 30 shots, had been selected.

Because of the wide range of rates, from below 200 to 2000 or more shots per minute, and variety of inputs, it would not be possible to use a single readout scale. Each input, for example, requires a scale with a different rate of expansion. The large range of rates means, furthermore, that the readings at the high end of the scale will be so crowded that readability will be seriously affected. Consequently a multiplicity of scales is necessary. In fact, in order to overcome the scale-crowding problem, a multiplicity of clocks is necessary. In the present instance satisfactory performance is obtained with two clocks having three scales on each.

Total burst-time T is longest with the thirty-shot input at the lowest rate of fire, being close to 9 seconds at 200 s.p.m. The clock 36 chosen to measure rates in this area has a sweep rate of 6 r.p.m. or one revolution in ten seconds. On this clock, therefore, the calibration for the various inputs would be as follows:

| Input shots | S.p.m. | (T) (sec.) | S.p.m. | (T) (sec.) |
|---|---|---|---|---|
| 10 | 2,000 | 0.27 | 54 | 10 |
| 20 | 2,000 | 0.57 | 114 | 10 |
| 30 | 2,000 | 0.87 | 174 | 10 |

Admittedly the high end of these scales would be crowded, so the second clock 37 having a sweep rate of 60 r.p.m. or one r.p.s. is used to display the high end of each scale expanded by a factor of ten. The usefulness of the expanded scales is extended still further by employing a variation of a multiple revolution technique. If the fast clock were used simply to expand the first second (or first 10%) of the slow clock's scales, most of its scale space would be wasted. The maximum rate of 2,000 s.p.m. would still occur at T equals 0.27 sec., 0.57 sec., and 0.87 sec. for inputs of 10, 20 and 30 shots, respectively. This would be wasting 27, 57 and 87% of these scales, while the slow clock would still require being read at the one-second position (540, 1,140 and 1,740 s.p.m.). By starting each fast scale at 2,000 s.p.m., however, and then continuing it for 360 degrees, these scales would provide expanded readings down to 425, 726 and 930 s.p.m.

The readout scales are non-linear because rate is a non-linear function of time. The calibration formula involves dividing a uniformly increasing rate (100, 101, 102 . . .) into a constant number (say, 1,000). This is a fraction in which the numerator remains constant while the denominator increases linearly; the value of such a fraction becomes lower as the denominator increases, but the increments of total value reduction decrease steadily as total value approaches closer and closer to zero.

For example:

½–⅓=⅙ (number "1" is the constant; denominators 2, 3, increase by 1 unit)

⅓–¼=1/12 (same numerator; same denominator increase; the interval, however, has been cut in half)

The formula used for forming the scales is $$A = C/R$$

Where:
A is angle in degrees, measure clockwise from top center of the dial.
C is the rate taken from the table below.
R is the rate in shots per minute.

| | Values of constant | | |
|---|---|---|---|
| | 10-shot input | 20-shot input | 30-shot input |
| 6 r.p.m. clock | 19,440 | 41,040 | 62,640 |
| 60 r.p.m. clock | 194,400 | 410,400 | 626,400 |

According to the formula, there is one and one one position on the dial corresponding to a given rate at a given input with a given single-speed clock. A change in any of these given items means a particular rate will appear at a different position on the dial. Which rates are shown on the dial depends on the requirements of the application. When these requirements include multiple inputs separate scales are mandatory. The scale limits (start and finish) are also dictated by such requirements. Scales may be arbitrarily begun at a chosen angle but they cannot then begin with the same rate on each scale. Conversely, the starting rate may be chosen but the angles will differ. The same applies to scale endings.

In practice, design is a compromise between many factors affecting the accuracy and legibility of the readout system.

The slow scales are left blank below the corresponding times (1.27, 1.57 and 1.87 seconds) to avoid ambiguity. The D.C. clutches operating the clocks are wired in parallel, so both clocks run for the full burst time. When they stop, the fast clock 37 will always have a reading (because it is calibrated for substantially the full 360 degrees). The slow clock, however, may or may not have a reading, depending on whether the burst time lasted long enough at the particular input used to traverse the blank scale space. If it has a reading, it is the correct one and the fast clock should be ignored; otherwise the fast clock is the only one having a reading and is obviously the one to read. The scales may be color-coded to correspond with a similar code on a "shots input" selector dial or provided with identifying lights as previously indicated.

Elimination of relays in the timing system reduces possible timing errors to those of the clocks themselves, or five milliseconds in this case. Clock error would effect accuracy most when burst time is shortest or in other words when rate is highest. At 2,000 s.p.m. a 5 ms. error represents 1.88, 0.88 and 0.58%. The 1.88% error at 2,000 s.p.m. with an input of ten shots exceeds the specified limits, but is acceptable for two reasons: (1) it is not expected that this rate will ever be used with this input; (2) in practice the clock error is usually much less than five milliseconds.

On the fast clock 5 ms. represents 1.8 degrees of pointer travel or, in terms of s.p.m., 38, 18, and 11½ s.p.m. The calibration is in units of 5 s.p.m. at this end of the scale, so readability exceeds guaranteed accuracy by a wide margin. Incidentally, the actual scales need not be calibrated over the entire 360 degrees. A certain amount of flexibility is possible at the low rates end of the scales to permit choice of cross-over points for the two clocks.

What is claimed is:

1. A rate counter for counting the rate of firing of shots comprising a meter having a clock driven pointer, a scale on the meter cooperating with the pointer, audio means for picking up the sounds of the shots, means responsive to the operation of said audio means and to the sound of the first shot being fired to initiate the movement of the pointer over the scale, and means responsive to the completion of a predetermined number of shots being picked up by said audio means for stopping the movement of the pointer.

2. A rate counter as set forth in claim 1 in which the audio means is a microphone and the output of said microphone is fed into a differentiating circuit to provide a signal selective of certain peaks in the sounds.

3. A rate counter as set forth in claim 2 in which the differentiated signal is fed into a preamplifier, and in series, a transmission line, an amplifier, an integrating circuit, a pulse generator and a counter, said counter feeding a signal to the means for stopping the movement of the pointer.

4. A rate counter as set forth in claim 3 in which additional means are provided to reset the counter and the pointer.

5. A rate counter as set forth in claim 1 in which further means are provided for varying the predetermined number of shots.

6. A rate counter as set forth in claim 1 in which a second audio means similar to the first audio means and located at a distance from the first audio means may be substituted for the first audio means.

7. A rate counter as set forth in claim 1 in which the predetermined number may be a selected number from a group of numbers and there are as many scales on the meter as there are numbers in the group.

8. A rate counter as set forth in claim 7 in which there are two meters which are substantially similar and of which the pointers move simultaneously in accordance with the rate of fire of the shorts, one of the pointers, however, moving at ten times the speed of the other and each of the scales on the meter with the slower moving pointer being expanded to be ten times that of the companion scale on the other meter.

9. A rate counter as set forth in claim 8 in which switch means are provided for selecting the predetermined number of shots to be utilized to stop pointer movement and indicating means on the meters associated with said switch to point out which scales on the meters are to be read.

10. A rate counter as set forth in claim 1 in which there are two meters which are similar and of which the pointers move simultaneously in accordance with the rate of fire of the shots, one of the pointers, however, moving at a faster rate than the speed of the other and the scale of the slower moving pointer being proportionally expanded to the companion scale on the other meter.

11. A rate counter as set forth in claim 1 in which there are two meters which are similar and of which the pointers move simultaneously in accordance with the rate of fire of the shots, one of the pointers, however, moving at ten times the speed of the other and the scale of the slower moving pointer being expanded to ten times that of the companion scale on the other meter.

12. A rate counter as set forth in claim 1 in which signal means are provided which remain energized in the event of non-termination of a selected number of shots and which becomes deenergized upon the selected completion of the number of shots.

13. A rate counter as set forth in claim 1 in which the predetermined number of shots is any one of a preselected group of numbers and the rate counter includes in cascade arrangement two or more ring counters, with means at two or more stages of the last of said ring counters to give an output pulse, said means for stopping the movement of the pointer including a manually operable switch coupled, at will, to any of the output means of said last ring counter.

14. A rate counter as set forth in claim 1 in which the predetermined number of shots in any one of 10, 20 or 30 and the rate counter includes in cascade arrangement a quinary ring counter, a binary bistable multivibrator and a ternary counter, with means at each stage of the ternary counter to give an output pulse, said means for stopping the movement of the pointer including a manually operable switch coupled, at will, to any of the output means of the ternary counter.

References Cited

UNITED STATES PATENTS

| | | | |
|---|---|---|---|
| 2,981,157 | 4/1961 | Marquardt | 89—135 |
| 3,217,601 | 1/1961 | Gardner | 89—135 |
| 3,319,222 | 5/1967 | Grant | 340—38 |

MAYNARD R. WILBUR, *Primary Examiner.*

G. J. MAIER, *Assistant Examiner.*